US008814516B2

(12) United States Patent
Lind

(10) Patent No.: US 8,814,516 B2
(45) Date of Patent: Aug. 26, 2014

(54) ARRANGEMENT WITH A NACELLE AND A RADIATOR ARRANGEMENT

(75) Inventor: Soeren Oemann Lind, Næstved (DK)

(73) Assignee: Siemens Aktiengesellschaft, Munich (DE)

( * ) Notice: Subject to any disclaimer, the term of this patent is extended or adjusted under 35 U.S.C. 154(b) by 762 days.

(21) Appl. No.: 12/917,526

(22) Filed: Nov. 2, 2010

(65) Prior Publication Data

US 2011/0123333 A1   May 26, 2011

(30) Foreign Application Priority Data

Nov. 24, 2009   (EP) ..................................... 09014635

(51) Int. Cl.
*F03D 11/00* (2006.01)
(52) U.S. Cl.
USPC ............................................................ 416/95
(58) Field of Classification Search
USPC ....................................................... 416/142
See application file for complete search history.

(56) References Cited

U.S. PATENT DOCUMENTS 1,549,202 A * 8/1925 McClane ......................... 244/57
2010/0034653 A1* 2/2010 Frokjaer .......................... 416/39

FOREIGN PATENT DOCUMENTS

| DE | 4130763 A1 | 3/1993 |
| DE | 102007042338 A1 | 3/2009 |
| EP | 1835128 A2 | 9/2007 |

* cited by examiner

*Primary Examiner* — Edward Look
*Assistant Examiner* — Jeffrey A Brownson

(57) ABSTRACT

A radiator arrangement is arranged on a nacelle of a wind turbine via a sliding arrangement. The sliding arrangement is constructed and arranged in a way that the radiator arrangement is allowed to change its position in reference to the nacelle between a first position and a second position. The radiator arrangement allows service from inside the nacelle if the radiator arrangement is the first position and the radiator arrangement transfers heat in its second position.

10 Claims, 3 Drawing Sheets

ARRANGEMENT WITH A NACELLE AND A RADIATOR ARRANGEMENT

CROSS REFERENCE TO RELATED APPLICATIONS

This application claims priority of European Patent Office application No. 09014635.8 EP filed Nov. 24, 2009, which is incorporated by reference herein in its entirety.

FIELD OF INVENTION

The invention relates to an arrangement with a nacelle of a wind turbine and with a radiator arrangement, which is used to transfer heat form the nacelle to the environment.

BACKGROUND OF INVENTION

The transport of wind turbine components is a challenge due to the physical dimensions of the components. Especially nacelles has to be transported as whole component, while typical nacelles, being used for an offshore site, may show a length up to 12 meters or more and a diameter up to 5 meters.

For a transportation on roads it is necessary, to plan the road-connection carefully, as a transport-vehicle has to circumvent or has to cope with all barriers like curves, tunnels, bridges, traffic lights, etc.

One example is the Elbe-tunnel, which is close to Hamburg, Germany. The tunnel shows a minimum height of 4.20 m, thus a transported component and the used vehicle has to comply with this height.

In Europe a standard height of new bridges is 4.50 m, but there are many older bridges, which show a lower height of clearance.

Thus the transport vehicle and the transported component have to be constructed in a way that they comply with all of those traffic barriers or traffic restrictions along the way to a planned site for the wind turbine.

Thus the construction of wind turbine components with a high diameter is limited in a certain way.

It is well-known that a radiator arrangement is arranged on top of a wind turbine.

FIG. 4A and FIG. 4B show a nacelle N and a radiator arrangement RA according to the known state of the art.

Due to the transport limitations the radiator arrangement and the nacelle are transported separately to the planned site. At the site the radiator arrangement is placed on top of the nacelle and is connected with the nacelle.

This work is done by a crane, which lifts up the radiator arrangement to the top of the nacelle. Additionally personal has to work on top and outside of the nacelle, thus the mounting of the nacelle is dangerous due to the height of the nacelle, the height of the tower and due to the weather-conditions outside of the nacelle.

It is also necessary to do service work at the radiator arrangement during the lifetime of the wind turbine. Even this service and maintenance work needs to be done by personal on top of the nacelle and thus outside of the nacelle. This work is dangerous as described above.

There is an additional limitation to do this work, as bad weather restricts the maintenance time.

SUMMARY OF INVENTION

It is therefore the object of the present invention to provide an improved arrangement, which enables personal to service the radiator in an easy and save way.

This object is achieved by the features of independent claims. Preferred configurations are object of the dependent claims.

According to the invention the arrangement contains a nacelle and a radiator arrangement. The radiator arrangement is constructed and positioned in reference to the nacelle in a way that the radiator arrangement transfers heat from the nacelle to the environment. The nacelle and the radiator arrangement are connected by a sliding arrangement. The sliding arrangement is constructed and arranged in a way that the radiator arrangement is allowed to change its position in reference to the nacelle between a first position and a second position. The radiator arrangement allows access, especially for service-work, from inside the nacelle if the radiator arrangement is the first position and the radiator arrangement transfers heat in its second position.

Preferably the radiator arrangement is arranged at least partly inside the nacelle in the first position for service purposes. Thus the radiator arrangement does not project above the nacelle in this position. Consequently the nacelle and the radiator arrangement form a common component in this position with a minimum height, while this height is destined by the height of the nacelle only.

This allows the transport of the nacelle and the radiator arrangement jointly as a common component. Thus barriers like tunnels or bridges along the way of transport can be overcome easily.

According to the invention the radiator arrangement and the nacelle can be installed and connected in a controlled production facility. It is no longer necessary to transport the nacelle and the needed radiator arrangement as separate components to the site.

Preferably the radiator arrangement and the nacelle are connected by flexible tubes, which are used to transport a cooling medium between the nacelle and the radiator arrangement. The connection between the radiator arrangement and the nacelle is closed at the production facility and maintained later. Thus the cooling medium can be filled into the closed cooling system at the production facility and therefore in a controlled environment.

According to the invention there is no longer the need to use a crane for the installation of the radiator arrangement to the nacelle at the site. Thus personal do not longer have to climb on top of the nacelle to install and fixate the radiator arrangement in its dedicated position. This ensures a save work while the radiator arrangement is installed and even while the radiator arrangement is serviced by people.

BRIEF DESCRIPTION OF THE DRAWINGS

The invention is described now in more detail by help of figures. The figures show different examples and do not limit the scope of the invention.

DETAILED DESCRIPTION OF INVENTION

Figure 1A:
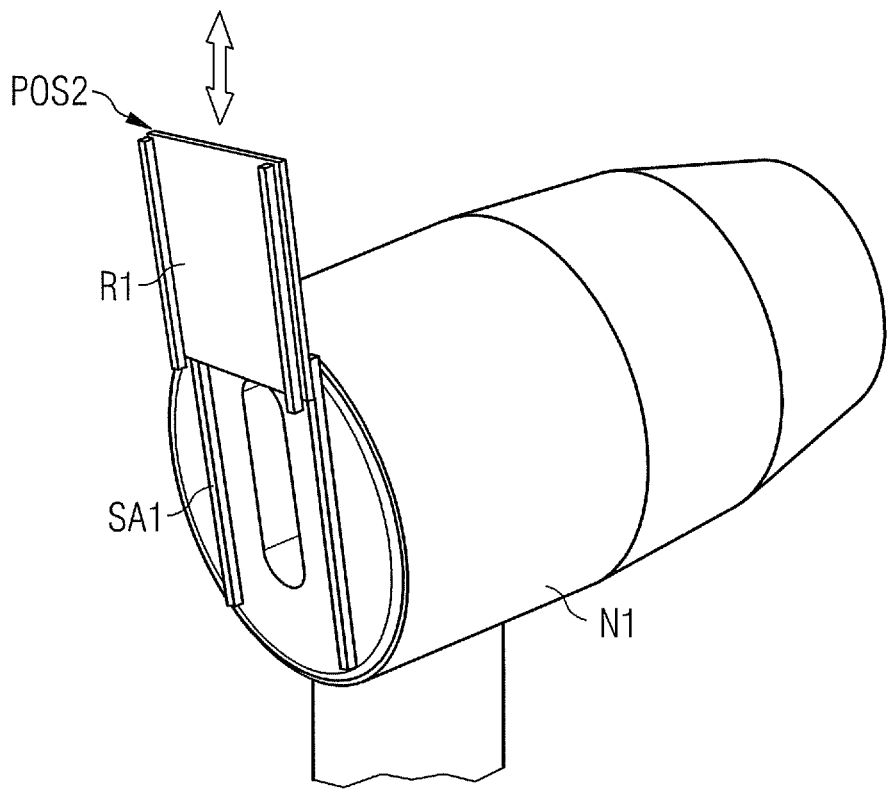
FIG. 1 shows a first arrangement according to the invention.
Figure 1B:
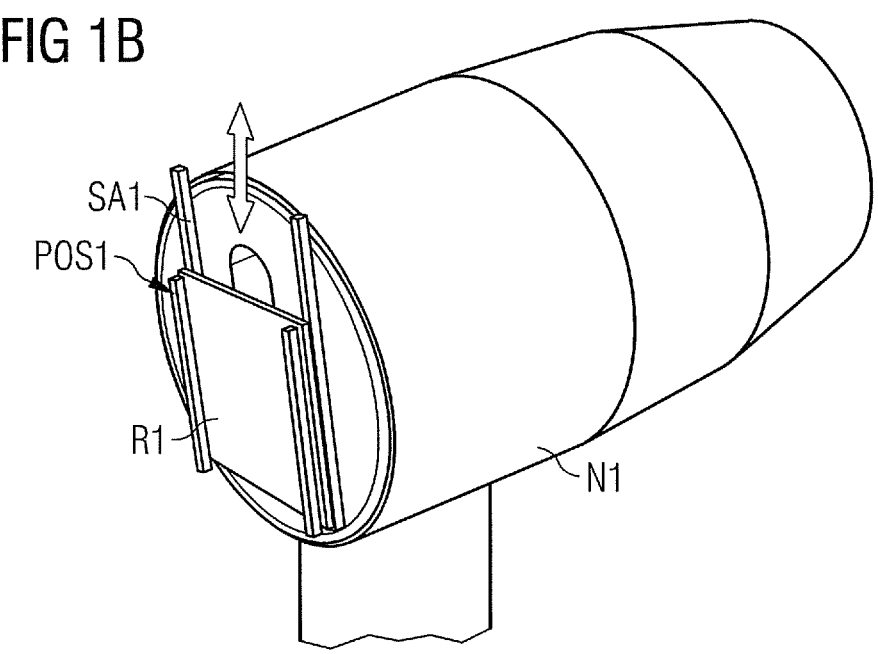

FIG. 1A and FIG. 1B show a first arrangement according to the invention.

A radiator arrangement R1 is constructed and positioned in reference to a nacelle N1 in a way that the radiator arrangement R1 transfers heat from the nacelle N1 to the environment.

The nacelle N1 and the radiator arrangement R1 are connected by a sliding-arrangement SA1. The sliding-arrangement SA1 is constructed and arranged in a way, that the radiator arrangement R1 is allowed to change its position in reference to the nacelle N1 between a first position POS1 and a second position POS2.

The radiator arrangement R1 allows service of the radiator R1 from inside the nacelle N1 if the radiator arrangement R1 is located at the first position POS1. Thus service personal do not have to leave the save nacelle for their work.

The radiator arrangement R1 transfers heat in its second position POS2. In this position POS2 it projects above the nacelle N1.

The radiator arrangement R1 and the nacelle N1 are connected by flexible tubes (not shown here in detail), which are used to transport a cooling medium between the nacelle N1 and the radiator arrangement R1 for the transfer of heat.

An electrical motor-system or a pneumatic-system or a hydraulic-system is connected with the radiator arrangement R1 and/or the nacelle N1 to change the position—not shown here in detail.

Preferably the sliding arrangement SA1 is an integrated part of the radiator arrangement R1 or of the nacelle N1.

In this configuration the sliding arrangement SA1 is positioned at the rear side of the nacelle N1 in its first position POS1. Thus the radiator arrangement R1 is covered or hidden by the circular cross section of the nacelle N1.

Figure 2:
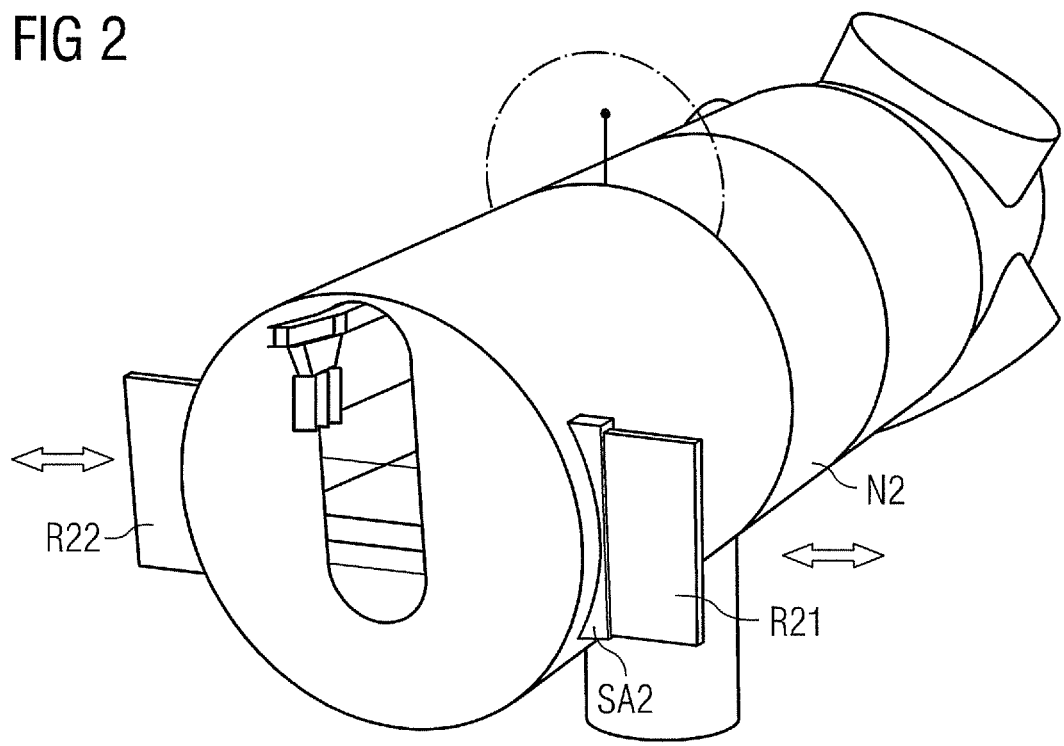
FIG. 2 shows a second arrangement according to the invention.

FIG. 2 shows a second arrangement according to the invention.

Two radiator arrangements R21 and R22 are constructed and positioned in reference to a nacelle N2 in a way that the radiator arrangements R21, R22 transfers heat from the nacelle N2 to the environment.

The nacelle N2 and the radiator arrangements R21, R22 are connected by a sliding-arrangement SA2.

The sliding-arrangement SA2 is constructed and arranged in a way, that the radiator arrangements R21, R22 are allowed to change their position in reference to the nacelle N2 between a first position and a second position.

The radiator arrangements R21, R22 allow service of the radiators R21, R22 from inside the nacelle N2 if the radiator arrangements R21, R22 are located at the first position.

In this position the radiator arrangements R21, R22 are arranged at least partly inside the nacelle N2. Thus service personal do not have to leave the save nacelle for their work.

The radiator arrangements R21, R22 transfer heat in their second position. In this position they projects above the longitudinal sides of the nacelle N2.

The sliding arrangement SA1 is positioned at the longitudinal sides of the nacelle N2.

The radiator arrangements R21, R22 are arranged perpendicular to the longitudinal side in the second position.

Figure 3:
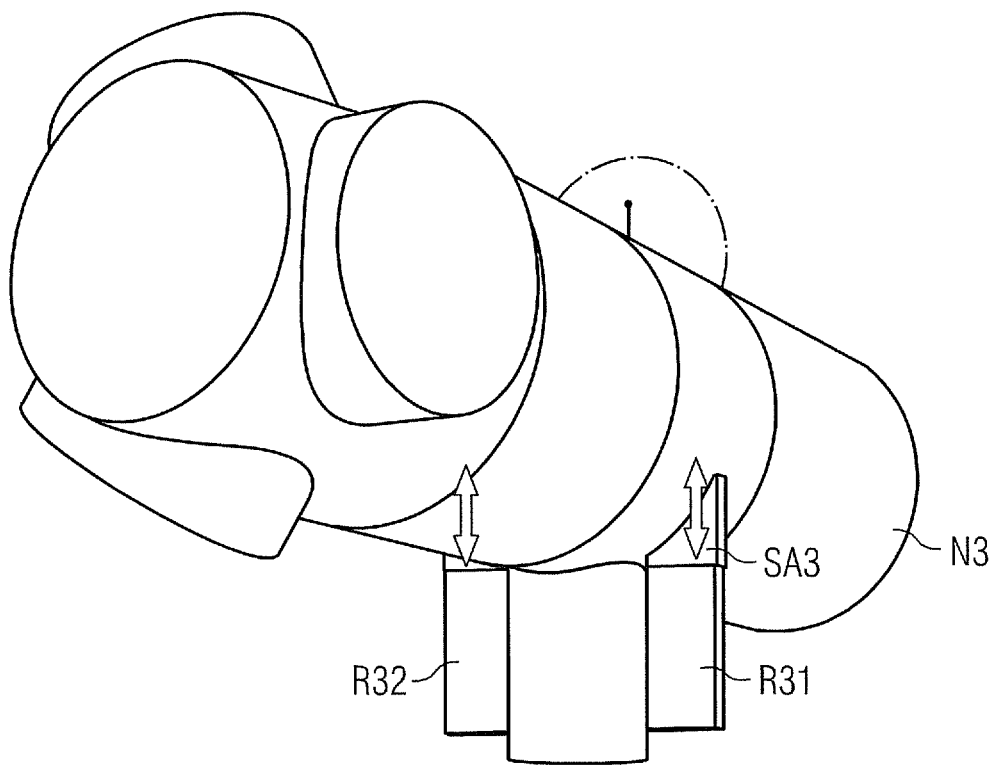
FIG. 3 shows a third arrangement according to the invention.
Figure 4A:
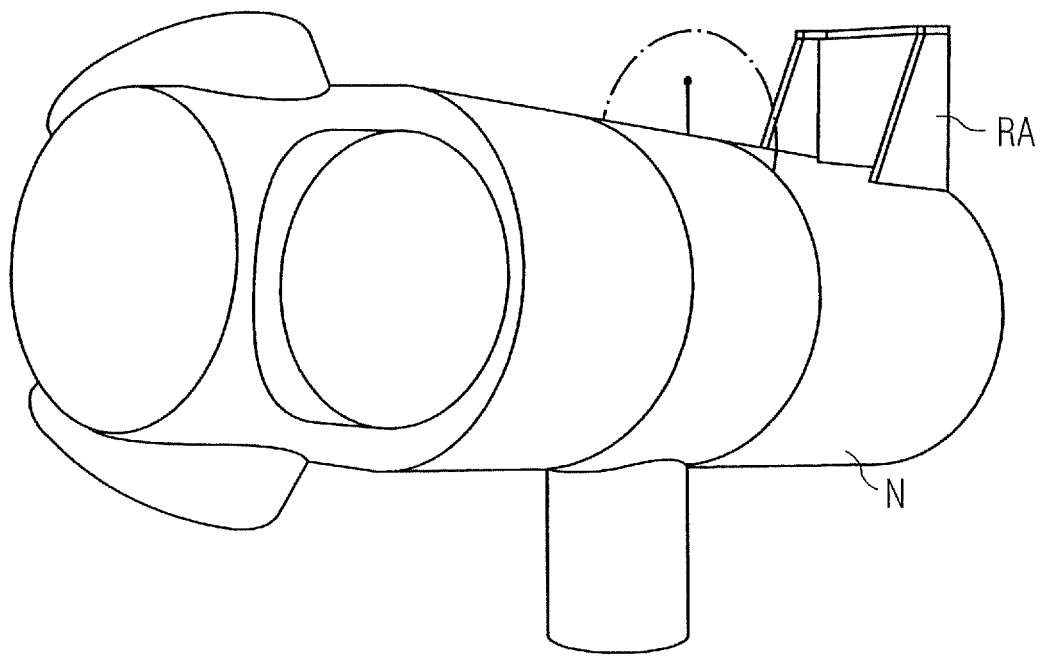
FIG. 4 shows a known configuration of a nacelle and a radiator as described in the introduction of this application.
Figure 4B:
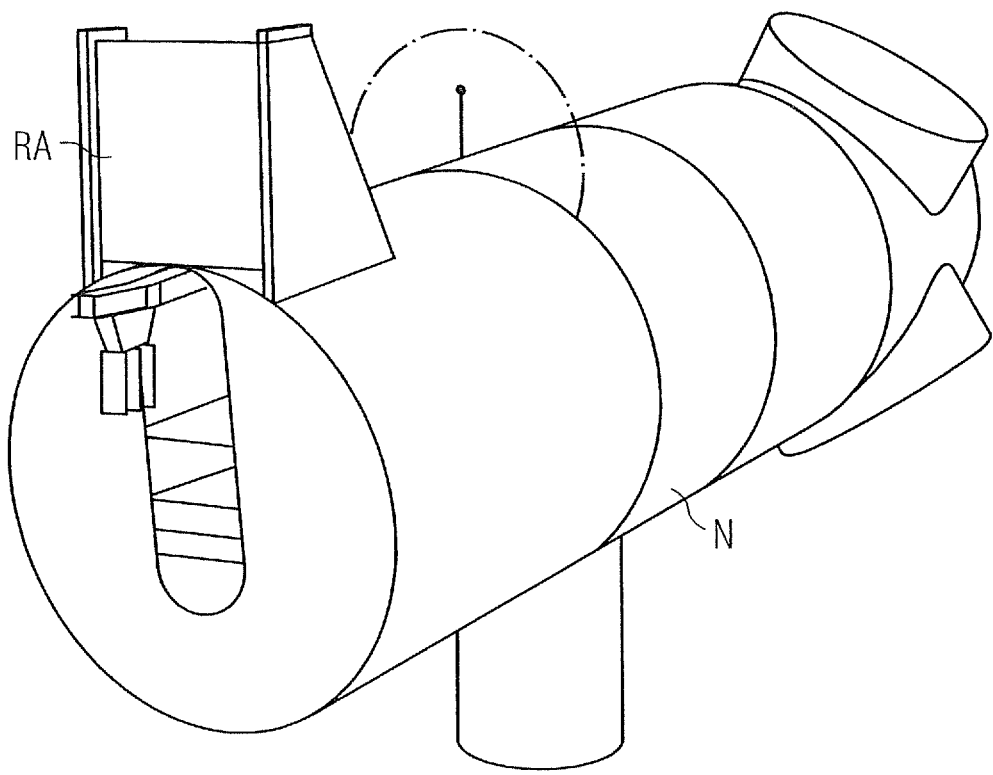

FIG. 3 shows a third arrangement according to the invention.

Two radiator arrangements R31 and R32 are positioned at the bottom side of the nacelle N3.

The nacelle N3 and the radiator arrangements R31, R32 are connected by a sliding-arrangement SA3.

The sliding-arrangement SA3 is constructed and arranged in a way that the radiator arrangements R31, R32 are allowed to change their position in reference to the nacelle N3 between a first position and a second position.

The radiator arrangements R31, R32 allow service of the radiators R31, R32 from inside the nacelle N3 if the radiator arrangements R31, R32 are located at the first position.

In this position the radiator arrangements R31, R32 are arranged at least partly inside the nacelle N3. Thus service personal do not have to leave the save nacelle for their work.

The radiator arrangements R31, R32 transfer heat in their second position. In this position they projects below the longitudinal bottom-side of the nacelle N3.

The sliding arrangement SA3 is positioned at the longitudinal bottom side of the nacelle N3.

The radiator arrangements R31, R32 are arranged perpendicular to the longitudinal bottom side of the nacelle, if they are in the second position.

The invention claimed is:

1. A wind turbine system comprising:
   a nacelle;
   a radiator arrangement disposed on an exterior of the nacelle; and
   a sliding arrangement disposed on the exterior of the nacelle that couples the nacelle to the radiator arrangement and which allows the radiator arrangement to slide between a plurality of positions with respect to the nacelle on the exterior of the nacelle,
   wherein the plurality of positions comprise a first position and a second position,
   wherein access to the radiator arrangement disposed on the exterior of the nacelle is provided from inside the nacelle in the first position such that a person does not have to leave the safety of the interior of the nacelle for service on the radiator arrangement in the first position, and
   wherein heat transfer from the nacelle to the environment is allowed by the radiator arrangement in the second position.

2. The wind turbine system according to claim 1, wherein the radiator arrangement and the nacelle are connected by flexible tubes, which are used to transport a cooling medium between the nacelle and the radiator arrangement for the transfer of heat.

3. The wind turbine system according to claim 2, wherein an electrical motor-system or a pneumatic-system or a hydraulic-system is connected with the radiator arrangement and/or the nacelle to change the position.

4. The wind turbine system according to claim 1, wherein an electrical motor-system or a pneumatic-system or a hydraulic-system is connected with the radiator arrangement and/or the nacelle to change the position.

5. The wind turbine system according to claim 1, wherein the sliding arrangement is an integrated part of the radiator arrangement or of the nacelle.

6. The wind turbine system according to claim 5, wherein the sliding arrangement is positioned so that when the radiator arrangement is in the first position the radiator arrangement is hidden by a cross section of the nacelle from a point of view in front of the nacelle.

7. The wind turbine system according to claim 1, wherein the sliding arrangement is disposed on an exterior of a rear wall of the nacelle, and wherein a rear wall of the nacelle defines an opening that allows access to the radiator arrangement in the first position by a person in the nacelle.

8. A wind turbine system comprising:
   a nacelle;
   a radiator arrangement disposed on an exterior of a rear portion of the nacelle; and
   a sliding arrangement disposed on the exterior of the rear portion of the nacelle that couples the nacelle to the radiator arrangement; and wherein the radiator arrangement is slideable between at least a first position and a second position with respect to the nacelle within the sliding arrangement on the exterior of the nacelle.

9. The wind turbine system according to claim 8, wherein the sliding arrangement is positioned such that in the first position the radiator arrangement is at least partially hidden by a cross section of the nacelle from a point of view in front of the nacelle.

10. The wind turbine system according to claim 9, wherein the sliding arrangement is positioned such that in the first position the radiator arrangement is entirely hidden by a cross section of the nacelle from a point of view in front of the nacelle.

* * * * *